March 27, 1962     H. B. DRAPEAU ET AL     3,027,089
SNAP-ON THERMOSTATIC VALVE
Filed Nov. 5, 1958     2 Sheets-Sheet 1
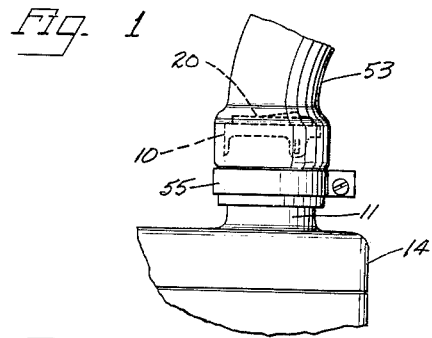
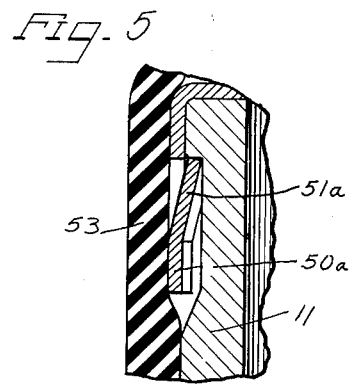
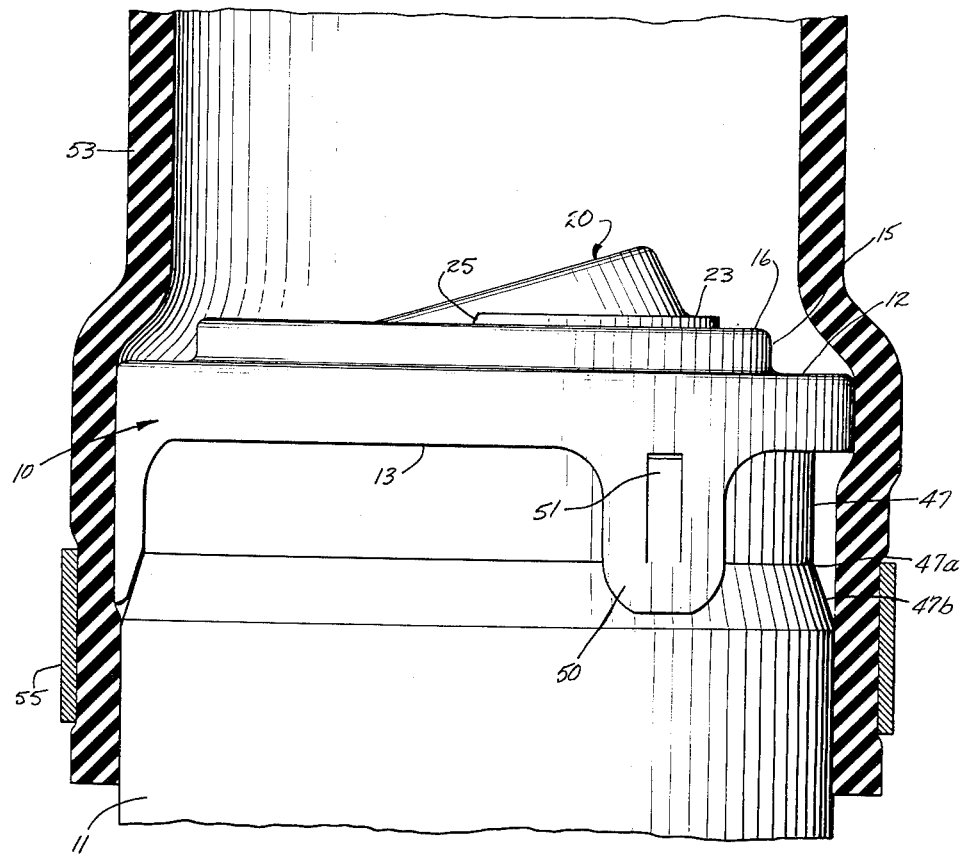
Inventor
HAROLD B. DRAPEAU
POUL J. OLSEN
by Hill, Sherman, Meroni, Gross & Simpson Attys.

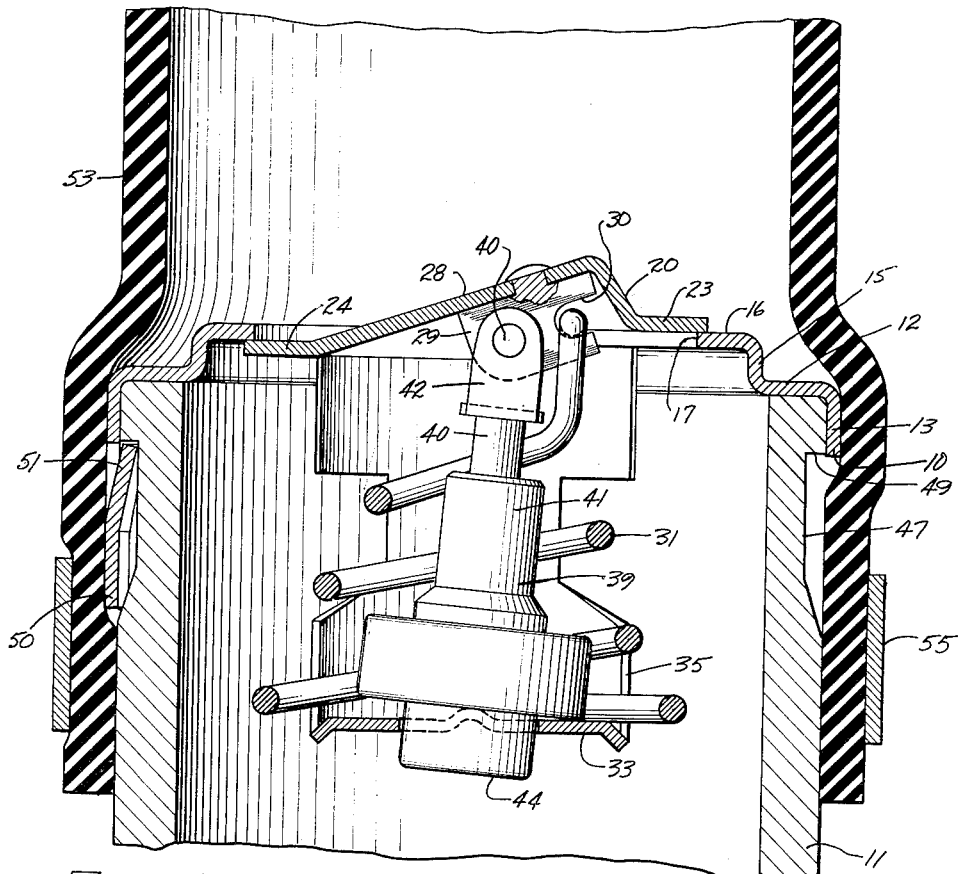
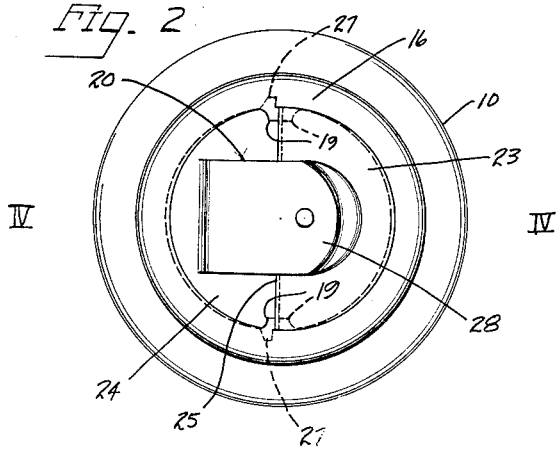

United States Patent Office 3,027,089
Patented Mar. 27, 1962

3,027,089
SNAP-ON THERMOSTATIC VALVE
Harold B. Drapeau, Oak Park, and Poul J. Olsen, Park Ridge, Ill., assignors to The Dole Valve Company, Morton Grove, Ill.
Filed Nov. 5, 1958, Ser. No. 772,022
2 Claims. (Cl. 236—34)

This invention relates to improvements in thermostatically operated valves and more particularly relates to a simplified form of waterline thermostatically operated valve, controlling the temperature of the coolant of an internal combustion engine.

A principal object of the invention is to provide a simplified form of thermostatic valve for controlling the temperature of the coolant of an internal combustion engine, so arranged as to avoid the need for the seals and detachable fittings heretofore required for such valves.

Another object of the invention is to provide an improved form of thermostatic valve of a simplified construction, positioned to control the temperature of the coolant of an internal combustion engine by snapping on the outlet hose coupling from the water jacket of the engine.

A still further object of the invention is to provide an improved form of waterline thermostatic valve maintained in temperature sensing relation with respect to the coolant of an internal combustion engine by snapping onto the outlet hose coupling from the water jacket of the internal combustion engine, in which the outlet hose connection forms the seal for the valve.

These and other objects of the invention will appear from time to time as the following specification proceeds and with reference to the accompanying drawing wherein:

FIGURE 1 is a fragmentary view of an internal combustion engine, showing an integral outlet coupling leading from the water jacket and having a thermostatic valve constructed in accordance with the invention mounted thereon;

FIGURE 2 is an enlarged plan view of the thermostatic valve;

FIGURE 3 is an enlarged view somewhat similar to FIGURE 1, with the hose and hose clamp shown in vertical section and the valve shown in side elevation;

FIGURE 4 is a vertical sectional view taken through the valve substantially along lines IV—IV of FIGURE 2, and showing the valve on the outlet hose coupling and sealed by the hose connection; and FIGURE 5 is a fragmentary sectional view illustrating a modified form in which my invention may be embodied.

In the embodiment of the invention illustrated in the drawings, an annular valve casing 10 is shown for attachment to a hose coupling or fitting 11 leading from the water jacket (not shown) in a cylinder head 14 of an internal combustion engine and formed integrally with the cylinder head.

The valve casing 10 may be made from a metallic stamping, stamped from a sheet or plate of brass or other suitable material and is herein shown as having a flat annular portion 12 adapted to abut the end of the hose coupling 11, and as having a generally cylindrical skirt 13 extending downwardly therefrom about the wall of the fitting 11. The annular portion 12 terminates at its inner margin into a vertical wall 15, from which extends a flat annular portion 16, the inner margin of which defines a flow orifice or port opening 17 for the valve.

The port opening 17, as shown in FIGURE 4, is generally circular in form and is divided into two halves, at the junction of which are spaced inwardly extending nibs 19. The spaces between said nibs form diametrically opposed slots disposed in a straight line, which defines a pivotal bearing area for a butterfly valve 20.

The butterfly valve 20 may comprise a metallic stamping and may be similar to the valve shown in the Brown Patent No. 2,493,336 dated January 10, 1950.

It should be understood, however, that the valve need not necessarily be a butterfly type of thermostatic valve, but may be a poppet type of valve, or may be of various other forms desired.

As shown in FIGURES 1, 2 and 3, the valve 20 comprises two vertically off-set relatively flat wing portions 23 and 24 connected together by an intermediate section 25, extending generally at right angles to the wing portions 23 and 24 and spacing said wing portions apart in generally parallel relation with respect to each other.

The height of the intermediate section 25 of the butterfly valve is determined by the thickness of the annular portion of the casing defining the port opening 17, and is such that one wing portion extends along the top side of the annular surface 16 of the valve casing and the other wing portion extends along the bottom side of said annular surface, when the valve is closed, as shown in FIGURE 4.

Two ears 27, 27 are shown as extending oppositely from the wing portion 23 of the valve 20, adjacent the intermediate portion 25 thereof. These ears extend laterally beyond the margins of the port opening 17, and abut the bottom of the annular portion 16 defining the port opening.

Thus, when the valve 17 is inserted through the slots defined by the inner margins of the inwardly extending nibs 19, 19, with the intermediate portion of the valve having engagement with said slots, the valve may be pivoted about this intermediate portion, to open or close the port opening 17.

A connecting ear 29 is shown as being riveted to and depnding from an outwardly pressed portion 28 of the wing portions 23 and 24 and as extending at right angles to the pivotal axis of the valve. The connecting ear 29 has an outwardly opening slot 30 therein forming a connector for a return spring 31, seated and crimped or otherwise secured at its large diameter end on a bridge portion 33, extending across the port opening 17 and spaced in an upstream direction with respect thereto. The bridge portion 33 is connected to the annular portion 16 of the valve casing 10 by spaced legs 35, which may be riveted or otherwise secured to said valve casing.

The valve 20 is moved to its open position by a thermostatic element 39, rockingly mounted on the bridge 33 and having a piston 40 extensible from a cylinder 41 of the thermostatic element. A yoke 42 mounted on the outer end portion of the piston 40 extends along opposite sides of the connecting ear 29, and is pivotally connected thereto on a pivot pin 43, spaced inwardly of the slot 30 in the connecting ear 29 toward the pivot point of the valve.

The thermostatic element 29 is herein shown as being a well known form of power type of thermostatic element in which a fusible temperature responsive material contained within a casing 44 of the thermal element extends the piston 40 from the cylinder 41 upon fusion of the thermally expansible material, as shown and disclosed in the Vernet Patent No. 2,368,181, dated January 30, 1945, and no part of the present invention so not herein shown or described further.

Referring now in particular to FIGURES 3 and 4 of the drawings, the hose coupling 11 has an annular recessed neck portion 47, extending thereabout and terminating at its upper end into a shoulder 49. The recess portion 47 has a lower end 47a which leads into a tapered frusto-conical surface 47b that joins the body of the hose coupling with the recessed portion 47.

The skirt 13 extends along the periphery of the outlet hose coupling 11 above the shoulder 49, and has a plurality of ears or tongues 50 extending downwardly therefrom having tangs 51 pressed inwardly from said tongues and extending along and angularly inwardly of said tongues toward the annular portion 12 of the valve casing and having terminal end portions facing said annular portion, for engagement under the shoulder 49 as the valve casing is snapped onto said hose coupling.

The tangs 51 may be permanently set in the positions shown in FIGURES 3 and 4 and the material from which the casing 10 is made has sufficient resiliency to retain said tangs in their inwardly extended position, to accommodate the casing 10 to be mounted on the hose coupling 11 by placing the lower portions of the ears 50 along the outer wall of the outlet fitting 11 and pressing down on the casing, to first press the tanks 51 outwardly as they pass along the outer wall portion of the casing and to then accommodate the tangs 51 to spring inwardly into position to engage under the shoulder 49, to positively retain the casing 10 in position on the outlet hose coupling, against the pressure of water flowing through the hose coupling.

Upon locking the casing in position on the outlet hose coupling by the tangs 51, a radiator hose 53 may then be placed about the casing 10 and coupling 11 in sealing engagement with the periphery of the casing 10 and with the lower margin thereof spaced beneath the lower margin of the annular recessed portion 47. A hose clamp 55 may then clamp the hose 53 to the outlet hose coupling 11, beneath the recessed portion 47, and thereby seal the casing 10 to the outlet hose coupling.

The hose 53 engages the skirt 13 and hose coupling under tension and thus has sealing engagement with the periphery of the hose coupling 11 upstream of the valve and also has sealing engagement with the periphery of the valve casing or skirt 13, and provides a sealed high pressure area upstream of the valve casing and a low pressure area downstream of the valve casing, when the valve is closed and thereby prevents leakage of high pressure fluid past the valve casing.

In the modification of the invention shown in FIGURE 5, the valve 20 and casing 10 are similar to the valve and casing in the form of the invention shown in FIGURES 1 to 4 inclusive, except the snap-on retainer tongues are unsupported in the neck portion 47. As shown in FIGURE 5, the skirt 13 of the valve casing 10 has tongues 50a having tangs 51a pressed inwardly therefrom for engagement under the shouldered portion 49 of the neck portion 47.

The tongues 51a are free in the neck portion 47 and are engaged by the inside of the hose 53 under tension. The hose 53, thus retains the tangs 51a in the groove 47 in engagement with the shoulder 49 of said groove.

It may be seen from the foregoing that a simple and inexpensive waterline thermostatic valve has been provided, which entirely eliminates the need for the usual seals and outlet housing clamping the thermostatic valve to the cylinder head of the internal combustion engine, and enables the thermostatic valve to be retained in position on the outlet hose connection from the cylinder head, merely by snapping the valve thereto.

It may further be seen that with the thermostatic valve of the present invention the radiator hose seals the high pressure and low pressure sides of the valve and prevents the passage of fluid past the valve casing when the valve is closed, and thereby renders the separate sealing gaskets heretofore required unnecessary.

While we have herein shown and described one form in which our invention may be embodied, it should be understood that various modifications and variations in the invention may be effected without departing from the spirit and scope of the novel concepts thereof.

We claim as our invention:

1. In a device for controlling the temperature of the coolant of an internal combustion engine and in combination with an outlet hose coupling having an annular recessed neck portion spaced from the outer end of said outlet hose coupling and extending thereabout, the upper margin of which annular recessed neck portion forms an abutment shoulder, a hose adapted to be coupled to the hose coupling and a hose clamp clamping the hose to the hose coupling, a thermostatic valve including a valve casing having an annular portion adapted to abut the end of said hose coupling and having a generally cylindrical skirt adapted to extend about said hose coupling, a plurality of tongues extending axially from said skirt over said recessed neck portion and spaced from said recessed neck portion when said valve casing is in position on said hose coupling, the central portions of said tongues having axially extending tangs pressed inwardly therefrom and extending angularly inwardly from the outer end portions of said tongues toward said annular portion of said valve casing and having end portions facing said annular portion of said valve casing for snapping engagement with said abutment shoulder upon the pressing of said valve casing downwardly along said hose coupling, said hose coupling being stretched about said skirt and extending downwardly along said hose coupling beneath said recessed neck portion and retaining said tangs to said recessed neck portion, and said hose clamp clamping said hose to said coupling and sealing the high and low pressure sides of said valve and retaining said tangs to said shoulder.

2. A device for controlling the temperature of the coolant of an internal combustion engine in accordance with claim 1 wherein a frusto-conical surface is located below said recessed neck portion and said tongues extend to engage said surface.

References Cited in the file of this patent

UNITED STATES PATENTS

| | | |
|---|---|---|
| 1,246,748 | Johnson | Nov. 13, 1917 |
| 2,157,770 | Mayo | May 9, 1939 |
| 2,710,146 | Drapeau | June 7, 1955 |